(12) United States Patent
Matsuyama et al.

(10) Patent No.: US 10,436,192 B2
(45) Date of Patent: Oct. 8, 2019

(54) SLIDING COMPONENT AND METHOD FOR PRODUCING THE SAME

(71) Applicant: KOMATSU LTD., Tokyo (JP)

(72) Inventors: Toshikazu Matsuyama, Hirakata (JP); Masaharu Amano, Hirakata (JP); Yoshitaka Shibata, Hirakata (JP)

(73) Assignee: KOMATSU LTD., Tokyo (JP)

( * ) Notice: Subject to any disclaimer, the term of this patent is extended or adjusted under 35 U.S.C. 154(b) by 184 days.

(21) Appl. No.: 15/560,222

(22) PCT Filed: Apr. 15, 2015

(86) PCT No.: PCT/JP2015/061589
§ 371 (c)(1),
(2) Date: Sep. 21, 2017

(87) PCT Pub. No.: WO2016/166839
PCT Pub. Date: Oct. 20, 2016

(65) Prior Publication Data
US 2018/0051693 A1 Feb. 22, 2018

(51) Int. Cl.
*B23K 20/12* (2006.01)
*F04B 53/16* (2006.01)
(Continued)

(52) U.S. Cl.
CPC ............ *F04B 53/162* (2013.01); *B23K 20/12* (2013.01); *B32B 5/16* (2013.01); *B32B 15/013* (2013.01);
(Continued)

(58) Field of Classification Search
CPC ...... B23K 2103/04–08; B23K 2103/12; B23K 2103/22; B23K 2101/008; B23K 2101/34; B23K 20/12–1215; B23K 20/1285–1295
(Continued)

(56) References Cited

U.S. PATENT DOCUMENTS 2,424,557 A * 7/1947 De Bra ................... B22F 7/004
419/2
4,079,491 A * 3/1978 Richardson ............... B23P 6/00
228/113
(Continued)

FOREIGN PATENT DOCUMENTS

CN 1281533 A 1/2001
CN 103402690 A 11/2013
(Continued)

OTHER PUBLICATIONS

Jul. 14, 2015 International Search Report issued in International Patent Application No. PCT/JP2015/061589.

*Primary Examiner* — Kiley S Stoner
(74) *Attorney, Agent, or Firm* — Oliff PLC

(57) ABSTRACT

A sliding component and its producing method are provided. The sliding component includes a base section made of steel or cast iron, and a sliding section having a sliding surface, made of copper alloy including hard particles, and joined to the base section. The hard particles in the sliding section are arranged such that those in a region including an outer periphery of the interface with the base section have their longitudinal directions coinciding with the directions along the outer periphery as compared to those in an inner peripheral side. This improves the durability of the sliding section in its region including the outer periphery of the interface with the base section.

6 Claims, 5 Drawing Sheets

(51) Int. Cl.
    *F16C 33/14*     (2006.01)
    *B32B 5/16*     (2006.01)
    *B32B 15/01*     (2006.01)
    *B32B 15/18*     (2006.01)
    *B32B 15/20*     (2006.01)
    *F01B 31/28*     (2006.01)
    *F16C 33/12*     (2006.01)
    *B23K 103/22*     (2006.01)

(52) U.S. Cl.
    CPC ............ *B32B 15/18* (2013.01); *B32B 15/20* (2013.01); *F01B 31/28* (2013.01); *F04B 53/16* (2013.01); *F16C 33/124* (2013.01); *F16C 33/14* (2013.01); *B23K 2103/22* (2018.08); *F16C 2204/10* (2013.01)

(58) Field of Classification Search
    USPC ........ 228/112.1–114.5, 262.4–262.41, 262.6, 228/2.1–2.3
    See application file for complete search history.

(56) References Cited

U.S. PATENT DOCUMENTS

| | | | |
|---|---|---|---|
| 4,817,852 A * | 4/1989 | Hill | B23K 20/129 228/113 |
| 6,110,268 A * | 8/2000 | Gross | F16D 69/028 106/36 |
| 6,334,568 B1 * | 1/2002 | Seeds | F16F 15/322 228/114.5 |
| 6,378,670 B1 * | 4/2002 | Kawakami | E04H 9/021 188/251 A |
| 6,425,314 B1 | 7/2002 | Kleinedler et al. | |
| 2006/0237160 A1 * | 10/2006 | Nitta | B22D 11/055 164/418 |
| 2008/0237304 A1 * | 10/2008 | Bridges | B23K 20/12 228/112.1 |
| 2009/0206705 A1 * | 8/2009 | Nies | B23K 20/12 310/361 |
| 2013/0333200 A1 | 12/2013 | Ishizaki et al. | |
| 2016/0228977 A1 * | 8/2016 | Shibata | F04B 1/124 |

FOREIGN PATENT DOCUMENTS

| | | | | |
|---|---|---|---|---|
| FR | 2012955 A1 | * | 3/1970 | ............ B23K 20/129 |
| GB | 1277579 A | * | 6/1972 | ............ B23K 20/129 |
| JP | 61171919 A | * | 8/1986 | |
| JP | H04-228548 A | | 8/1992 | |
| JP | H04-283295 A | | 10/1992 | |
| JP | H08-105448 A | | 4/1996 | |
| JP | H10-89241 A | | 4/1998 | |
| JP | 10287941 A | * | 10/1998 | ................ B22F 5/08 |

* cited by examiner

SLIDING COMPONENT AND METHOD FOR PRODUCING THE SAME

TECHNICAL FIELD

The present invention relates to sliding components and methods for producing sliding components. More specifically, the present invention relates to a sliding component which includes a base section made of steel or cast iron and a sliding section made of copper alloy and joined to the base section, and a method for producing the sliding component.

BACKGROUND ART

As a sliding component which slides with respect to another component, one having a structure in which a sliding section made of copper alloy is fixed to a base section made of steel or cast iron may be used. For example, as a piston shoe of a hydraulic pump or a hydraulic motor, one having a base section made of steel to which a sliding section made of copper alloy is fixed is known. As a piston shoe of this type, one in which the sliding section is fixed to the base section by caulking may be used.

In order for the sliding section to be fixed to the base section by caulking, however, the sliding section needs to be machined to a predetermined shape enabling the caulking, before being attached to the base section. This increases the production cost of the sliding component due to the expense required for machining the sliding section. On the other hand, a piston shoe in which the sliding section is fixed to the base section by pressing the sliding section against the base section so that the sliding section is deformed and thus engaged with the base section has been proposed (see, for example, Japanese Patent Application Laid-Open No. H10-89241 (Patent Literature 1)).

CITATION LIST

Patent Literature

Patent Literature 1: Japanese Patent Application Laid-Open No. H10-89241

SUMMARY OF INVENTION

Technical Problem

With the structure of the conventional sliding component described above, there is a risk that when another component or the like comes into contact with a region of the sliding section including an outer periphery of its interface with the base section, wear of that region will be accelerated.

An object of the present invention is to provide a sliding component and its producing method that ensure improved durability of the sliding section in its region including the outer periphery of the interface with the base section.

Solution to Problem

A sliding component according to the present invention includes: a base section made of steel or cast iron; and a sliding section having a sliding surface, made of copper alloy including hard particles, and joined to the base section. The hard particles are arranged such that the hard particles in a region of the sliding section including an outer periphery of an interface with the base section have longitudinal directions coinciding with directions along the outer periphery as compared to the hard particles in an inner peripheral side of the sliding section.

In the sliding component of the present invention, copper alloy including hard particles is adopted as the material constituting the sliding section. In a region of the sliding section including the outer periphery of the interface with the base section, the hard particles are arranged to have their longitudinal directions coinciding with the directions along the outer periphery as compared to those in the inner peripheral side. The hard particles arranged in this manner improve the durability of the sliding section in its region including the outer periphery of the interface with the base section. As such, according to the sliding component of the present invention, it is possible to provide the sliding component that ensures improved durability of the sliding section in its region including the outer periphery of the interface with the base section.

In the above-described sliding component, the copper alloy may be high-strength brass. The high-strength brass is a material which has high strength and excellent sliding characteristics, and is suitable as the material constituting the sliding section.

In the above-described sliding component, the hard particles may be of an intermetallic compound. Specifically, the hard particles may be of, for example, Fe (iron)-Ni (nickel) based intermetallic compound, Al (aluminum)-Si (silicon) based intermetallic compound, Mn (manganese)-Si based intermetallic compound, or the like. The hard particles may be, for example, those precipitated or crystallized in the copper alloy constituting the sliding section.

A method for producing a sliding component according to the present invention includes the steps of: preparing a base member made of steel or cast iron and having a recessed portion formed therein, and a sliding member made of copper alloy including hard particles; and joining the base member and the sliding member. The step of joining the base member and the sliding member includes a step of increasing temperatures of the base member and the sliding member by relatively rotating the sliding member with respect to the base member while relatively pressing the sliding member against the base member with at least a part of the sliding member being received in the recessed portion, and a step of stopping the relative rotation of the sliding member with respect to the base member and cooling the base member and the sliding member with the members being pressed against each other.

In the sliding component producing method of the present invention, the base member and the sliding member are heated as the sliding member is relatively rotated while being pressed against the base member. The sliding member made of copper alloy is smaller in deformation resistance than the base member made of steel or cast iron. Thus, when heated, the copper alloy constituting the sliding member flows plastically. The plastic flow becomes large on the outer peripheral side of rotation, or, in the outer peripheral side of the contact surfaces of the base member and the sliding member. As a result, when the rotation is stopped and the both members are cooled and thus joined, a sliding component having the hard particles arranged as in the sliding component of the present invention is obtained.

As such, according to the sliding component producing method of the present invention, it is possible to produce the sliding component that ensures improved durability of the sliding section in its region including the outer periphery of the interface with the base section.

In the sliding component producing method described above, the base member may include a recessed portion bottom surface defining the recessed portion, and a recessed portion side surface defining the recessed portion and extending in a direction intersecting the recessed portion bottom surface. In the step of increasing the temperatures of the base member and the sliding member, the sliding member may be relatively rotated while being pressed against the recessed portion bottom surface of the base member. This facilitates production of the sliding component of the present invention.

In the sliding component producing method described above, in the step of increasing the temperatures of the base member and the sliding member, the sliding member may be deformed to contact the recessed portion side surface. Consequently, the plastic flow becomes still larger in the outer peripheral side of the contact surfaces of the base member and the sliding member. This further facilitates production of the sliding component of the present invention.

The sliding component producing method described above may further include the step of, in a state where the base member and the sliding member are joined, machining the base member to remove the recessed portion side surface. With this configuration, it is possible to obtain the sliding component which is formed as the base member is joined at its recessed portion bottom surface to the sliding member.

In the sliding component producing method described above, in the step of increasing the temperatures of the base member and the sliding member, the sliding member may be rotated while the base member is fixed. This makes it readily possible to carry out the sliding component producing method described above.

The sliding component producing method described above may further include the step of, in a state where the base member and the sliding member are joined, removing a flash formed due to deformation of the sliding member in the step of increasing the temperatures of the base member and the sliding member. With this configuration, it is possible to obtain the sliding component from which the flash formed when joining the base member and the sliding member has been removed.

Effects of the Invention

As is clear from the above description, according to the sliding component and its producing method of the present invention, it is possible to improve the durability of the sliding section in its region including the outer periphery of the interface with the base section.

DESCRIPTION OF EMBODIMENT

Figure 1:
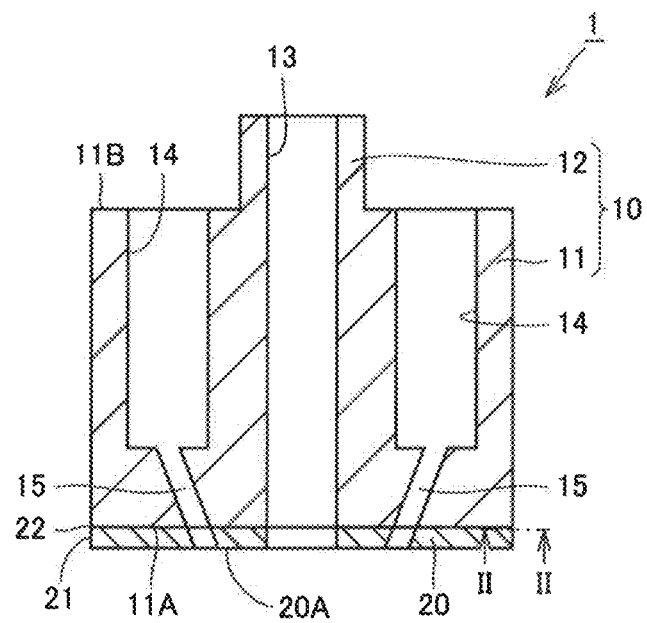
FIG. 1 is a schematic cross-sectional view showing the structure of a cylinder block.

An embodiment of the present invention will now be described. In the following drawings, the same or corresponding parts are denoted by the same reference numerals, and the description thereof will not be repeated.

FIG. 1 is a schematic cross-sectional view showing the structure of a cylinder block as an example of the sliding component according to the present invention. Referring to FIG. 1, the cylinder block 1 is a sliding component constituting a hydraulic pump or a hydraulic motor. The cylinder block 1 includes a base section 10 and a sliding section 20. The base section 10 is made of steel or cast iron. In the present embodiment, the base section 10 is made of steel. For the steel constituting the base section 10, for example, alloy steel for machine structural use (such as JIS SCM440) or carbon steel for machine structural use that has undergone thermal refining, or, quenching and tempering can be adopted.

The sliding section 20 is made of copper alloy including hard particles. The sliding section 20 has a sliding surface 20A. The sliding section 20 is joined to the base section 10.

The base section 10 includes a main body 11 having a cylindrical outer shape, and a protruding portion 12 which protrudes from the central portion of one end face of the main body 11 in the axial direction. The sliding section 20 is joined to the base section 10 in such a way as to cover a first end face 11A, which is the other end face of the base section 10 opposite to the side where the protruding portion 12 is formed. The sliding section 20 has a disk shape. The sliding surface 20A of the sliding section 20 is for sliding with respect to the valve plate of a hydraulic pump or a hydraulic motor.

A center hole 13 is formed to axially penetrate through a region including the protruding portion 12. The center hole 13 penetrates through the base section 10 and the sliding section 20. The center hole 13 is for receiving the center shaft of a hydraulic pump or a hydraulic motor.

The main body 11 of the base section 10 has a plurality of cylindrical bore portions 14 formed therein, which are open at a second end face 11B, i.e. the end face on the side where the protruding portion 12 is formed, and extend in the axial direction. The bore portions 14 are arranged side by side along the periphery of the main body 11. The bore portions 14 are spaces for receiving the pistons of a hydraulic pump or a hydraulic motor.

Oil passages 15 are formed to connect the bottoms of the bore portions 14 to the sliding surface 20A. The oil passages 15 allow oil to flow therethrough in a hydraulic pump or a hydraulic motor.

Figure 2:
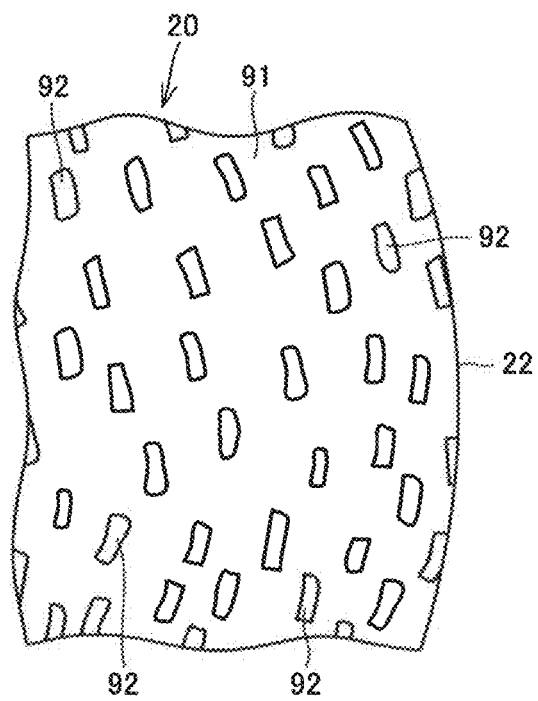
FIG. 2 is a schematic diagram showing the metallic structure in the cross section along the line II-II in FIG. 1.

FIG. 2 is a schematic diagram showing the metallic structure in the cross section along the line II-II in FIG. 1. FIG. 2 shows the metallic structure of the sliding section 20 in the vicinity of an outer periphery 22 of its interface with the base section 10. As shown in FIG. 2, hard particles 92 existing in a region of the sliding section 20 including the outer periphery 22 of the interface with the base section 10 are arranged with their longitudinal directions coinciding with the directions along the outer periphery 22 as compared to those in the inner peripheral side (for example, in the vicinity of the center hole 13).

Referring to FIG. 2, copper alloy constituting the sliding section 20 includes a matrix 91 and the hard particles 92 dispersed in the matrix 91. In a region of the sliding section 20 including an outer peripheral surface 21 of the sliding section 20 and also including the interface with the base section 10, the hard particles 92 are arranged to have their longitudinal directions coinciding with the directions along the outer peripheral surface 21, or, the circumferential directions, as compared to the hard particles in the inner peripheral side (for example, in the vicinity of the center hole 13). The hard particles 92 existing in the region of the sliding section 20 including the interface with the base section 10 are arranged so that their longitudinal directions become closer to the directions along the outer periphery 22 (directions along the outer peripheral surface 21) with decreasing distance from the outer periphery 22 (with decreasing distance from the outer peripheral surface 21).

For each of the hard particles 92 in the sliding section 20, the ratio between the projected area in the circumferential direction (tangential direction) and that in the radial direction is greater in the region including the outer periphery 22 than in the inner peripheral side. In the region of the sliding section 20 including the interface with the base section 10, the hard particles 92 existing in the inner peripheral side (for example, in the vicinity of the center hole 13) have their longitudinal directions oriented at random. In the region of the sliding section 20 including the interface with the base section 10, the hard particles 92 existing in the region including the outer periphery 22 have their longitudinal directions apt to coincide with the circumferential directions.

In the cylinder block 1 which is the sliding component according to the present embodiment, copper alloy including hard particles 92 is adopted as a material constituting the sliding section 20. In a region of the sliding section 20 including the outer periphery 22 of the interface with the base section 10, these hard particles 92 are arranged with their longitudinal directions coinciding with the directions along the outer periphery 22, as compared to those in the inner peripheral side. The hard particles 92 arranged in this manner leads to improved durability of the sliding section 20 in its region including the outer periphery 22 of the interface with the base section 10. As a result, the cylinder block 1 becomes a sliding component that is improved in durability of the sliding section 20 in its region including the outer periphery 22 of the interface with the base section 10.

In the present embodiment, the copper alloy constituting the sliding section 20 is preferably high-strength brass. High-strength brass is a material having both high strength and excellent sliding characteristics, and is suitable for use as a material constituting the sliding section 20.

The hard particles 92 may be of an intermetallic compound, for example. Specifically, the hard particles 92 may be of Fe—Ni based intermetallic compound, Al—Si based intermetallic compound, Mn—Si based intermetallic compound, or the like. The hard particles 92 may be, for example, those precipitated or crystalized in the copper alloy (high-strength brass) constituting the sliding section 20.

Figure 3:
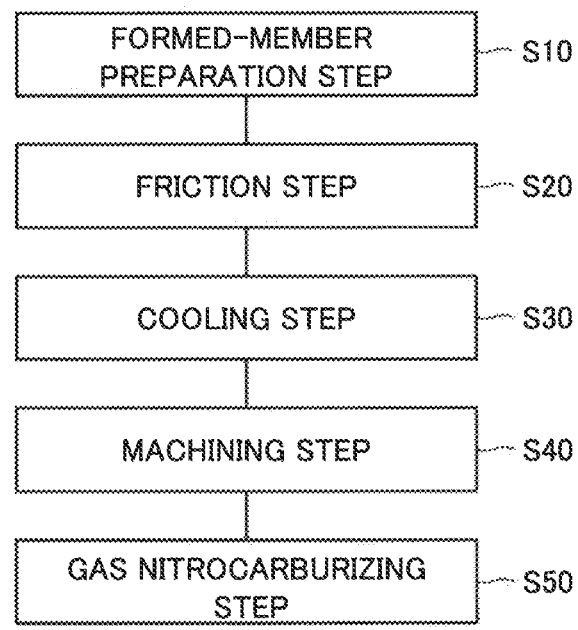
FIG. 3 is a flowchart schematically illustrating a method for producing a cylinder block.

A method for producing the cylinder block 1 will now be described. FIG. 3 is a flowchart schematically illustrating the cylinder block producing method. FIGS. 4 to 8 are schematic diagrams illustrating the cylinder block producing method.

Referring to FIG. 3, in the method for producing the cylinder block 1 in the present embodiment, first, a formed-member preparation step is carried out as a step S10. In this step S10, a base member, made of steel or cast iron and having a recessed portion formed therein, is prepared.

Figure 4:
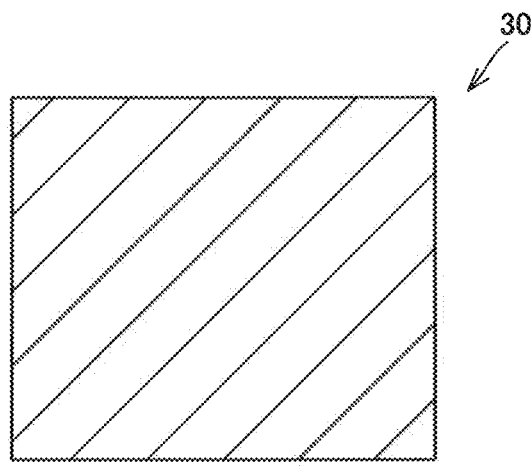
FIG. 4 is a schematic diagram illustrating the cylinder block producing method.
Figure 5:
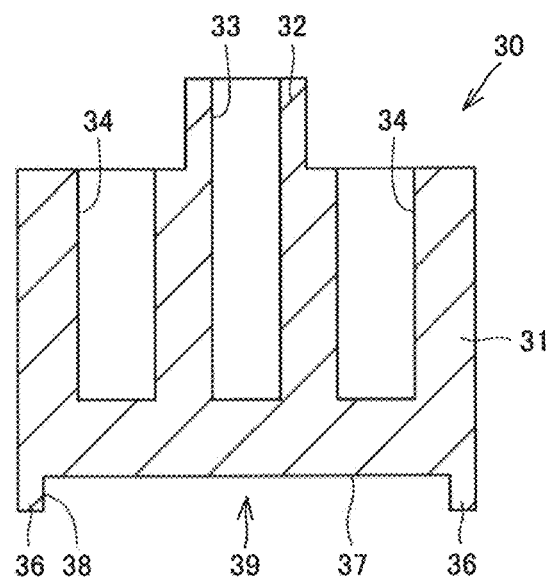
FIG. 5 is another schematic diagram illustrating the cylinder block producing method.

Referring to FIG. 4, in this step S10, first, a cylindrical base member 30 made of JIS SCM440, for example, is prepared. This base member 30 is subjected to hot forging, so that the base member 30 is formed roughly into a shape of the base section 10, as shown in FIG. 5.

The base member 30, thus hot forged, includes a cylindrical main body 31 corresponding to the main body 11, and a protruding portion 32 corresponding to the protruding portion 12. A center recessed portion 33 corresponding to the center hole 13 and bore portions 34 corresponding to the bore portions 14 are also formed in the base member 30.

At an end face of the base member 30 opposite to the protruding portion 32 side, an outer peripheral wall portion 36 is formed to surround the outer peripheral portion. The region surrounded by the outer peripheral wall portion 36 corresponds to a recessed portion 39. The recessed portion 39 is formed in the base member 30. The base member 30 includes a recessed portion bottom surface 37 defining the recessed portion 39, and a recessed portion side surface 38 defining the recessed portion 39 and extending in a direction intersecting the recessed portion bottom surface 37. The recessed portion 39 is a space of cylindrical (disk) shape.

The base member 30 thus formed is subjected to thermal refining. Through this step S10, the base member 30 having the recessed portion 39 formed therein is prepared.

Next, a friction step is carried out as a step S20. In this step S20, referring to FIG. 6, in a state where a separately prepared sliding member 40, made of copper alloy including hard particles, is partially received in the recessed portion 39, the sliding member 40 is relatively rotated while being pressed against the base member 30, so that the base member 30 and the sliding member 40 are increased in temperature.

The sliding member 40 has a cylindrical shape. With the central axis of the base member 30 and the central axis of the sliding member 40 aligned with each other, the sliding member 40 and the base member 30 relatively rotate about a rotational axis α while an end face 41 of the sliding member 40 is being pressed against the recessed portion bottom surface 37 of the base member 30. The end face 41 may be left as cut, for example. In the present embodiment, the sliding member 40 is rotated while the base member 30 is fixed.

At the beginning of rotation, there is a gap between an outer peripheral surface 42 of the sliding member 40 and the recessed portion side surface 38 of the base member 30. At the start of rotation, the outer peripheral surface 42 of the sliding member 40 is not in contact with the recessed portion side surface 38 of the base member 30. The contact surfaces (end face 41 and recessed portion bottom surface 37) of the sliding member 40 and the base member 30 are surrounded by the outer peripheral wall portion 36 of the base member 30.

Figure 6:
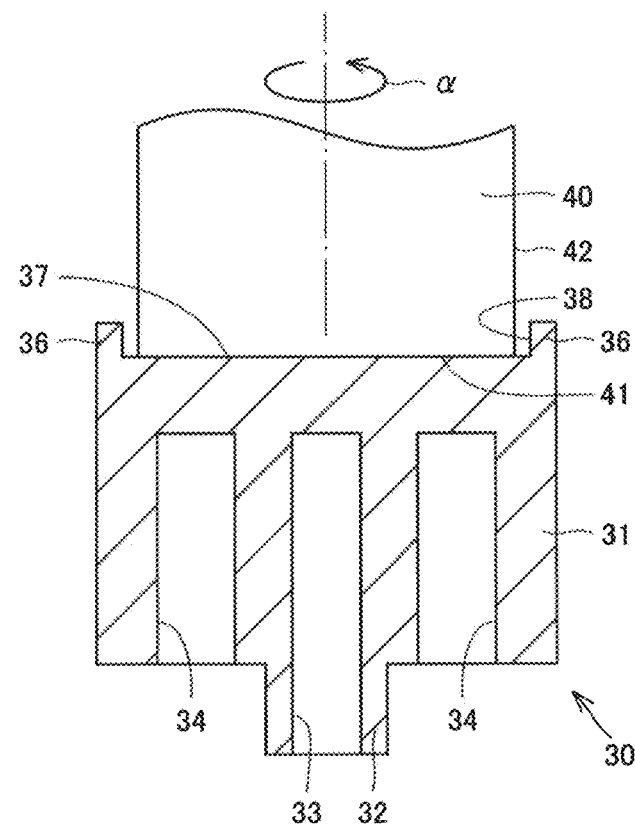
FIG. 6 is another schematic diagram illustrating the cylinder block producing method.
Figure 7:
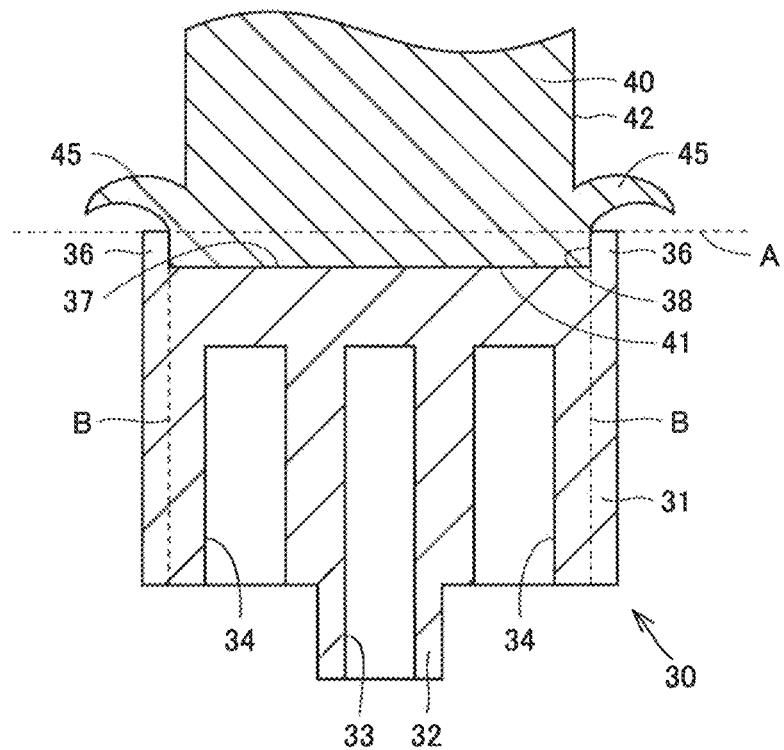
FIG. 7 is another schematic diagram illustrating the cylinder block producing method.

Referring to FIGS. 6 and 7, as the temperatures of the sliding member 40 and the base member 30 increase with the friction between the sliding member 40 and the base member 30, the sliding member 40 having a smaller deformation resistance than the base member 30 undergoes deformation. As a result, the sliding member 40 contacts the recessed portion side surface 38 of the base member 30. Further, the sliding member 40 thus deformed forms a flash 45. The temperature of the sliding member 40 is increased, for example, to a temperature that is not lower than the softening point and lower than the melting point of high-strength brass constituting the sliding member 40.

Next, a cooling step is carried out as a step S30. In this step S30, the relative rotation of the sliding member 40 with respect to the base member 30 is stopped, and the base member 30 and the sliding member 40 are joined. Referring to FIG. 7, the sliding member 40 and the base member 30 heated in the step S20 are cooled, while being maintained in the state of contacting each other. Consequently, the end face 41 of the sliding member 40 and the recessed portion bottom surface 37 of the base member 30 are joined. The steps S20 and S30 constitute an enclosed friction welding step.

Next, a machining step is carried out as a step S40. In this step S40, the sliding member 40 and the base member 30 joined together are subjected to machining such as cutting. Referring to FIG. 7, in the step S40, in the state where the base member 30 and the sliding member 40 are joined, the flash 45 formed as a result of deformation of the sliding member 40 in the step S20 is removed. The flash 45 is removed as the sliding member 40 is cut along the broken line A. The sliding member 40 is cut in a plane parallel to the end face 41. After cutting, if any flash remains in the sliding member 40 joined to the base member 30, the flash may be removed by cutting, grinding, or other machining.

Referring to FIG. 7, in the step S40, the base member 30 is further machined so that the recessed portion side surface 38 is removed in the state where the base member 30 and the sliding member 40 are joined. When the base member 30 is cut along the broken lines B, the outer peripheral region including the outer peripheral wall portion 36 is removed. Through the above-described procedure, a joined body of the base member 30 and the sliding member 40 shown in FIG. 8 is obtained.

Figure 8:
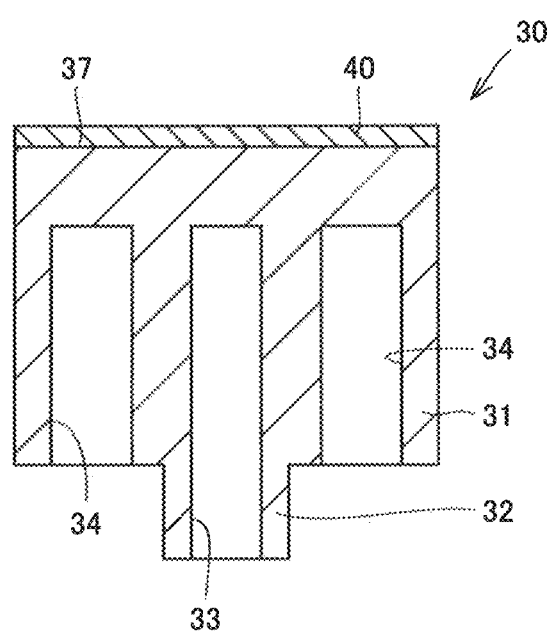
FIG. 8 is another schematic diagram illustrating the cylinder block producing method.

Thereafter, referring to FIGS. 8 and 1, machining is further performed to obtain the cylinder block 1 having the oil passages 15, the center hole 13, the bore portions 14, etc.

Next, a gas nitrocarburizing step is carried out as a step S50. In this step S50, the gas nitrocarburizing processing is carried out on the cylinder block 1 obtained through machining in the step S40. Specifically, while being heated within an atmosphere including ammonia gas to a temperature lower than the $A_1$ transformation point of the steel constituting the base section 10, a nitrided layer is formed on a surface portion of the base section 10. Thereafter, finishing processing is carried out as appropriate, whereby the cylinder block 1 according to the present embodiment is completed.

In the method for producing the cylinder block 1 as a sliding component in the present embodiment, the base member 30 and the sliding member 40 are heated as the sliding member 40 is relatively rotated while being pressed against the base member 30. The sliding member 40 made of copper alloy has a smaller deformation resistance than the base member 30 made of steel. Thus, when heated, the copper alloy constituting the sliding member 40 flows plastically. The plastic flow becomes large on the outer peripheral side of rotation, or, in the outer peripheral side of the contact surfaces of the base member 30 and the sliding member 40. As a result, when the rotation is stopped and the members are joined together, the hard particles 92 are arranged as in the cylinder block 1 of the present embodiment described above.

As such, according to the method for producing a cylinder block 1 in the present embodiment, it is possible to produce the cylinder block 1 that ensures improved durability of the sliding member 20 in its region including the outer periphery 22 of the interface with the base member 10.

Further, with the sliding member 40 being deformed to contact the recessed portion side surface 38 in the step S20, the plastic flow becomes still larger in the outer peripheral side of the contact surfaces of the base member 30 and the sliding member 40. This facilitates making the hard particles 92 arranged as in the cylinder block 1 in the present embodiment described above.

EXAMPLE

Figure 9:
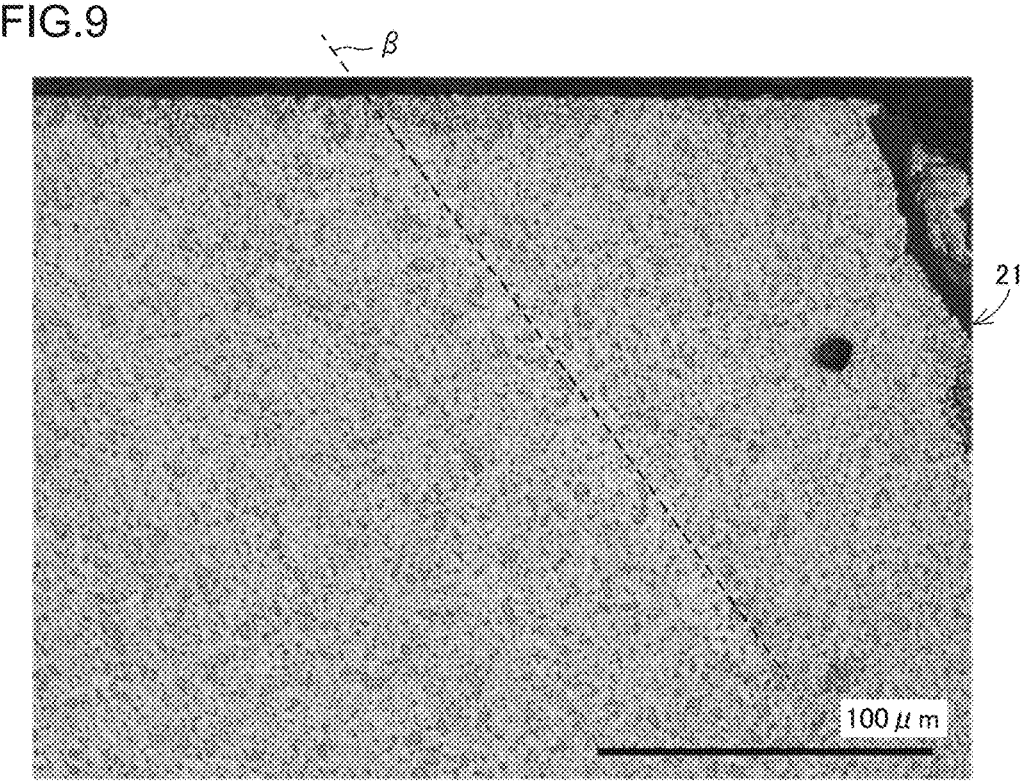
FIG. 9 is an optical micrograph showing the arrangement of hard particles in the sliding section in the vicinity of the outer periphery of the interface with the base section.
Figure 10:
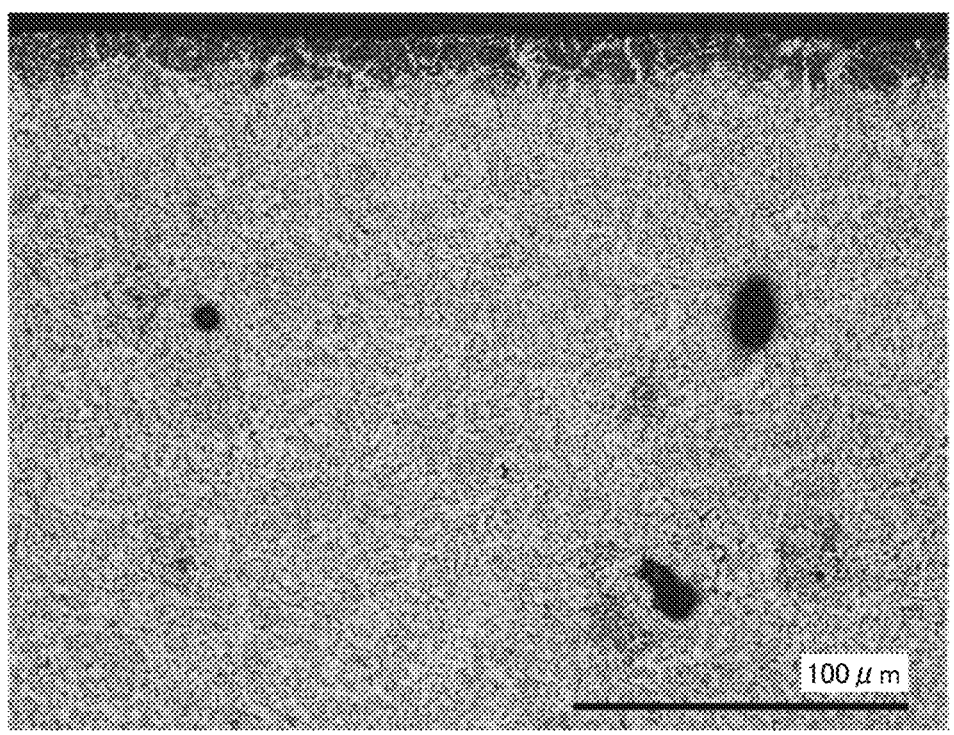
FIG. 10 is an optical micrograph showing the arrangement of hard particles in the sliding section in the vicinity of the central portion of the interface with the base section.

An experiment was conducted in which a base member and a sliding member were joined through a similar procedure as in the above embodiment to confirm the arrangement of hard particles in the sliding member near the base member. FIG. 9 is an optical micrograph showing the arrangement of hard particles in the sliding section (sliding member) in the vicinity of the outer periphery of the interface with the base section (base member). FIG. 10 is an optical micrograph showing the arrangement of hard particles in the sliding section (sliding member) in the vicinity of the central portion of the interface with the base section (base member).

In FIG. 9, the directions along the outer peripheral surface 21 (along the outer periphery of the interface of the sliding section with the base section) are shown by the broken line β. Referring to FIG. 9, it is recognized that in the vicinity of the outer periphery, the longitudinal directions of the hard particles are apt to coincide with the directions β along the outer periphery. Referring to FIG. 10, in the vicinity of the central portion, no clear tendency is recognized regarding the longitudinal directions of the hard particles. The tendency that the longitudinal directions of the hard particles coincide with the directions β along the outer periphery becomes stronger in the outer peripheral side as compared to the inner peripheral side.

In FIG. 9, traces of plastic flow in the directions β along the outer periphery (near the broken line β) are also observed. From this, it is considered that the above-described tendency of the arrangement of the hard particles is attributable to the plastic flow. Utilizing such plastic flow can achieve the above-described arrangement of the hard particles.

The above experimental results show that the sliding component producing method according to the present invention is able to produce the sliding component according to the present invention.

While the cylinder block has been described as an example of the sliding component of the present invention in the above embodiment, the sliding component of the present invention is not limited thereto. The present invention is applicable to a variety of sliding components which include a base section made of steel or cast iron and a sliding section having a sliding surface, made of copper alloy including hard particles, and joined to the base section.

It should be understood that the embodiment and example disclosed herein are illustrative and non-restrictive in every respect. The scope of the present invention is defined by the terms of the claims, rather than the description above, and is intended to include any modifications and improvements within the scope and meaning equivalent to the terms of the claims.

INDUSTRIAL APPLICABILITY

The sliding component and its producing method according to the present invention may be applicable particularly advantageously to the sliding component that includes a base section made of steel or cast iron and a sliding section made of copper alloy including hard particles and joined to the base section.

DESCRIPTION OF REFERENCE NUMERALS

1: cylinder block; 10: base section; 11: main body; 11A: first end face; 11B: second end face; 12: protruding portion; 13: center hole; 14: bore portion; 15: oil passage; 20: sliding section; 20A: sliding surface; 21: outer peripheral surface; 22: outer periphery; 30: base member; 31: main body; 32: protruding portion; 33: center recessed portion; 34: bore portion; 36: outer peripheral wall portion; 37: recessed portion bottom surface; 38: recessed portion side surface; 39: recessed portion; 40: sliding member; 41: end face; 42: outer peripheral surface; 45: flash; 91: matrix; and 92: hard particle.

The invention claimed is:

1. A method for producing a sliding component, comprising the steps of:
   preparing a base member made of steel or cast iron and having a recessed portion formed therein, and a sliding member made of copper alloy including hard particles; and
   joining the base member and the sliding member,
   the step of joining the base member and the sliding member including steps of
      increasing temperatures of the base member and the sliding member by relatively rotating the sliding member with respect to the base member while relatively pressing the sliding member against the base member with at least a part of the sliding member being received in the recessed portion, and
      stopping the relative rotation of the sliding member with respect to the base member and cooling the base member and the sliding member with the members being pressed against each other.

2. The method for producing a sliding component according to claim 1, wherein
   the base member includes
      a recessed portion bottom surface defining the recessed portion, and
      a recessed portion side surface defining the recessed portion and extending in a direction intersecting the recessed portion bottom surface, and
   in the step of increasing the temperatures of the base member and the sliding member, the sliding member is relatively rotated while being relatively pressed against the recessed portion bottom surface of the base member.

3. The method for producing a sliding component according to claim 2, wherein in the step of increasing the temperatures of the base member and the sliding member, the sliding member is deformed to contact the recessed portion side surface.

4. The method for producing a sliding component according to claim 2, further comprising the step of, in a state where the base member and the sliding member are joined, machining the base member to remove the recessed portion side surface.

5. The method for producing a sliding component according to claim 1, wherein in the step of increasing the temperatures of the base member and the sliding member, the sliding member is rotated while the base member is fixed.

6. The method for producing a sliding component according to claim 1 further comprising the step of, in a state where the base member and the sliding member are joined, removing a flash formed due to deformation of the sliding member in the step of increasing the temperatures of the base member and the sliding member.

* * * * *